(12) United States Patent
Nitta et al.

(10) Patent No.: US 8,416,518 B2
(45) Date of Patent: Apr. 9, 2013

(54) MAGNETIC DISK DRIVE AND METHOD FOR REWRITING DATA BLOCK

(75) Inventors: Tatsuo Nitta, Ome (JP); Hideaki Tanaka, Kawasaki (JP); Tatsuya Haga, Ome (JP); Tadashi Hongawa, Ome (JP); Takahiro Shinbori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 13/079,698

(22) Filed: Apr. 4, 2011

(65) Prior Publication Data

US 2011/0292533 A1  Dec. 1, 2011

(30) Foreign Application Priority Data

May 31, 2010 (JP) ................................. 2010-125137

(51) Int. Cl.
  *G11B 27/36* (2006.01)
  *G11B 5/09* (2006.01)
(52) U.S. Cl. .......................................... 360/31; 360/48
(58) Field of Classification Search .................. None
  See application file for complete search history.

(56) References Cited

U.S. PATENT DOCUMENTS

| 6,560,181 B1 | 5/2003 | Takahashi |
| 7,124,317 B2 | 10/2006 | Yoshino et al. |
| 7,412,585 B2 | 8/2008 | Uemura |
| 2001/0010085 A1* | 7/2001 | Rafanello et al. ............. 714/710 |
| 2005/0223154 A1 | 10/2005 | Uemura |
| 2006/0239144 A1 | 10/2006 | Gotoh et al. |

FOREIGN PATENT DOCUMENTS

| JP | 01-144273 A | 6/1989 |
| JP | 01-144274 A | 6/1989 |
| JP | 01-166367 A | 6/1989 |
| JP | 10-177769 | 6/1998 |
| JP | 2001-143399 A | 5/2001 |
| JP | 2001-283515 A | 10/2001 |
| JP | 2002-132456 A | 5/2002 |
| JP | 2005-293774 | 10/2005 |
| WO | WO 2004/023483 | 3/2004 |

OTHER PUBLICATIONS

Notice of Reasons for Rejection mailed by the Japan Patent Office on Oct. 25, 2011 in corresponding Japanese Patent Application No. 2010-125137 in 4 pages.

* cited by examiner

*Primary Examiner* — Regina N Holder
(74) *Attorney, Agent, or Firm* — Knobbe, Martens, Olson & Bear LLP

(57) ABSTRACT

According to one embodiment, a magnetic disk includes a disk, a controller and an indicator module. The disk includes a plurality of data sectors. The controller is configured to control data rewrite for reading a first data block stored in the disk and writing a second data block corresponding to the read first data block to a write destination on the disk. The indicator module is configured to embed an indicator indicative of an attribute relating to data rewrite in each sector data in the second data block written to the write destination when the each sector data is written to the write destination.

9 Claims, 10 Drawing Sheets

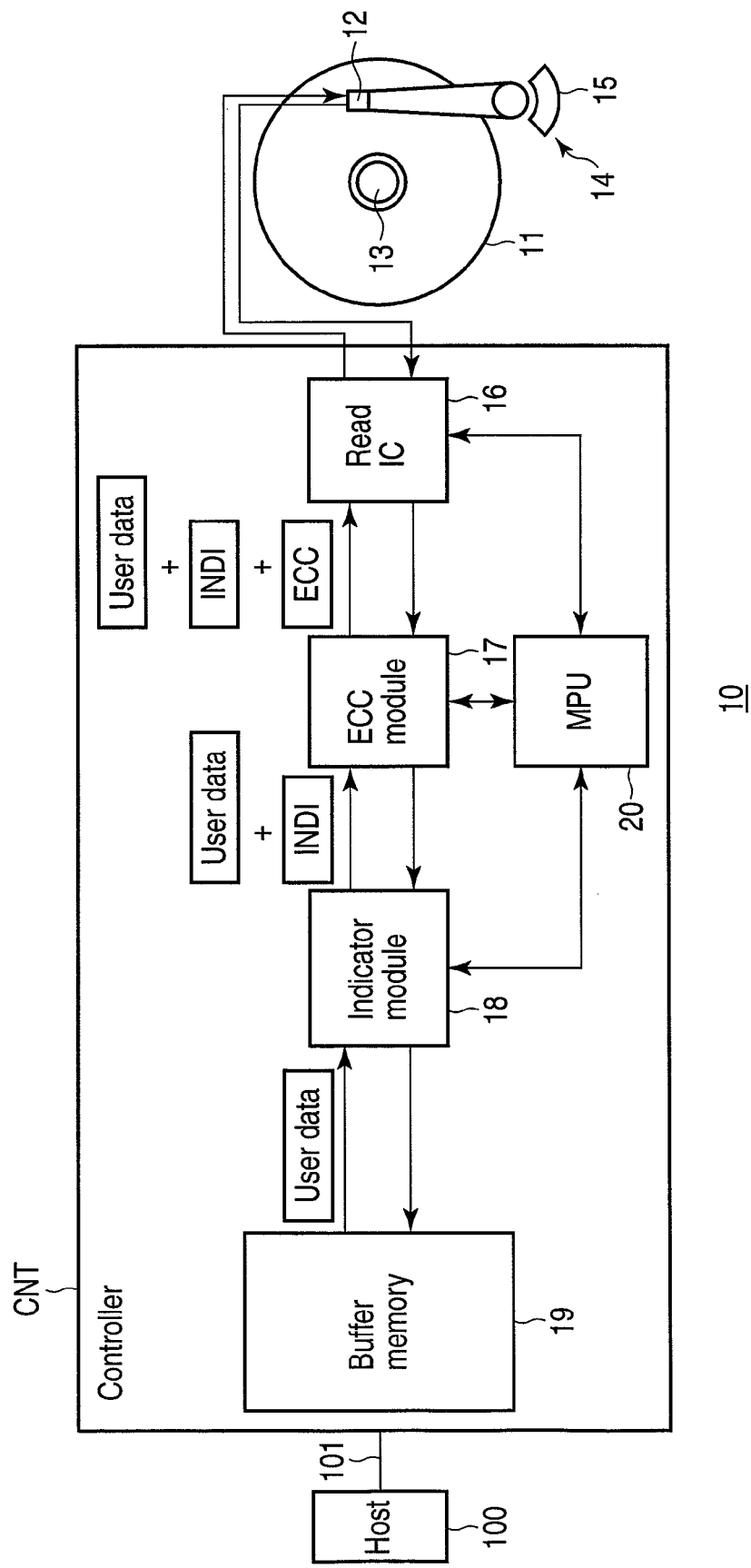
F I G. 1

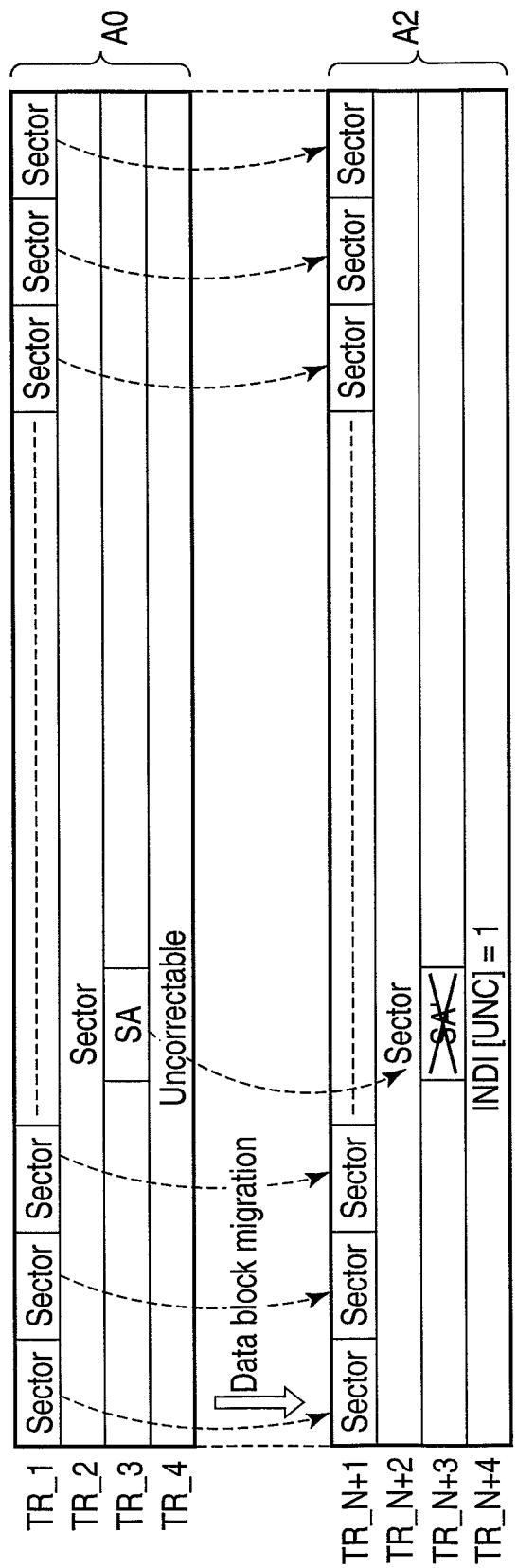
F I G. 4

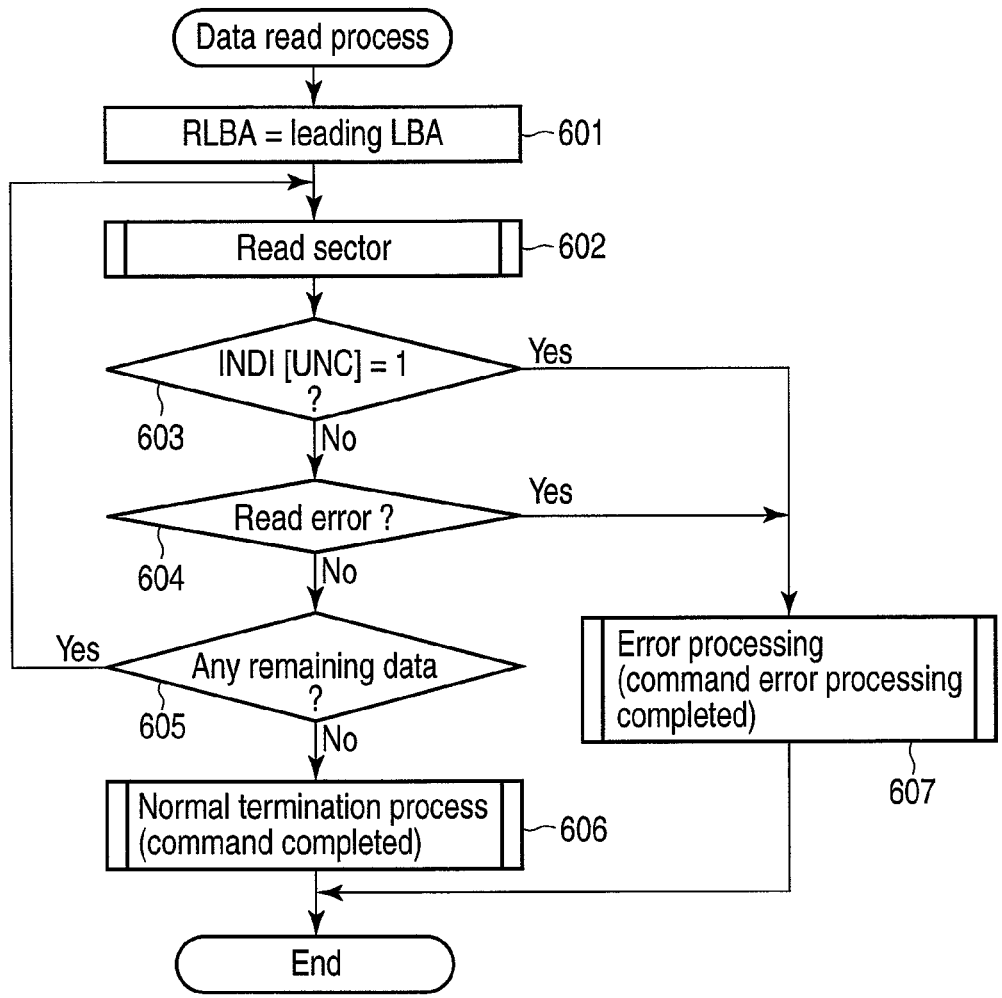
F I G. 6
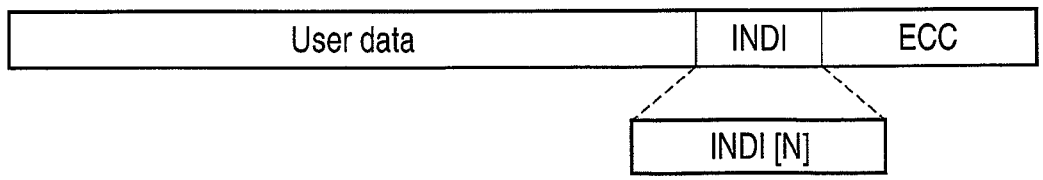
F I G. 7

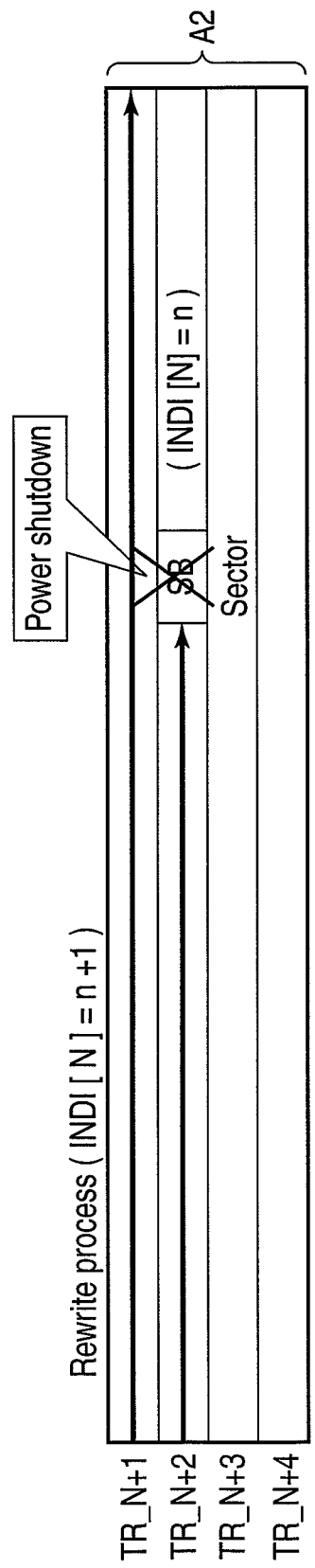
F I G. 9

MAGNETIC DISK DRIVE AND METHOD FOR REWRITING DATA BLOCK

CROSS-REFERENCE TO RELATED APPLICATIONS

This application is based upon and claims the benefit of priority from Japanese Patent Application No. 2010-125137, filed May 31, 2010; the entire contents of which are incorporated herein by reference.

FIELD

Embodiments described herein relate generally to a magnetic disk drive and a method for rewriting a data block.

BACKGROUND

In general, in a magnetic disk drive, a mass of data stored in the disk, what is called a data block, is rewritten by, for example, migration. The migration of a data block is executed by the following procedure. Here, it is assumed that a data block stored in a first area of the disk is migrated to a second area of the disk. In this case, first, the data block is read from the first area of the disk. Then, the read data block is written to the second area of the disk. Alternatively, a part of the read data may be replaced with write data specified by a host, and the replaced data may then be written to the second area.

Because of the data block migration, when the data block is read from the first area, a read error may occur. Here, it is assumed that the first area comprises a plurality of sectors (data sectors) including a sector SA. It is further assumed that when data (sector data) in the sector SA is read, a read uncorrectable error occurs which cannot be corrected based on an error correction code (ECC). It is also assumed that the second area comprises a plurality of sectors including a normal sector SA' and that the relative position of the sector SA' in the second area coincides with that of the sector SA in the first area.

Even when an error occurs in data read from the sector SA, if the data block is written to the second area, then after the write of the data block, the content of the sector SA' is different from that of the sector SA. Thereafter, if the data in the sector SA' is read, for example, in accordance with a request from the host, since the sector SA' is normal, the data read is very likely to be achieved normally. In this case, data different from that written to the sector SA, that is, incorrect (invalid) data (sector data) is returned from the magnetic disk drive to the host. However, not only the host but also the magnetic disk drive has difficulty determining that the sector data read from the sector SA' is incorrect.

Furthermore, power to the magnetic disk drive may be shut down during the write of the data block to the second area. Thus, there has been a demand for the capability of detecting possible power shutdown during the write of the data block.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an exemplary configuration of electronic device comprising a magnetic disk drive according to a first embodiment;

FIG. 4 is a diagram illustrating an exemplary data rewrite according to the first embodiment;

FIG. 6 is a flowchart showing an exemplary procedure of a data read process applied in the first embodiment;

FIG. 7 is a diagram showing an example of a sector data format applied in a second embodiment;

FIG. 9 is a diagram illustrating a principle for identification of a sector where processing has been suspended as a result of power shutdown during the data block migration process;

DETAILED DESCRIPTION

Various embodiments will be described hereinafter with reference to the accompanying drawings. In general, according to one embodiment, a magnetic disk comprises a disk, a controller and an indicator module. The controller is configured to control data rewrite for reading a first data block stored in the disk and writing a second data block corresponding to the read first data block to a write destination on the disk. The indicator module is configured to embed an indicator indicative of an attribute relating to data rewrite in each sector data in the second data block written to the write destination when the each sector data is written to the write destination.

FIG. 1 is a block diagram showing an exemplary configuration of electronic device comprising a magnetic disk drive according to a first embodiment. In FIG. 1, the electronic device comprises a magnetic disk drive (HDD) 10 and a host 100. The electronic device is, for example, a personal computer, a video camera, a music player, a mobile terminal, or a mobile phone. The host 100 utilizes HDD 10 as a storage device for the host 100. The host 100 is connected to HDD 10 (more specifically, a controller CNT in HDD 1 which will be described below) via a host interface 101.

In a first embodiment, it is assumed that well-known shingled write is applied to HDD 10. HDD 10 comprises a disk (magnetic disk) 11 as a recording medium. The disk 11 comprises two disk surfaces, an upper disk surface and a lower disk surface. The upper disk surface if the disk 11 forms a recording surface on which data is magnetically recorded. A head (magnetic head) 12 is located over the recording surface of the disk 11. The head 12 includes a write element and a read element and is used to write data to the disk 11 and to read data from the disk 11. For convenience of drawing, FIG. 1 shows an example HDD 10 with one head 12. However, the two disk surfaces of the disk 11 may both form recording surfaces, and heads may be arranged over the respective disk surfaces. Furthermore, in the configuration in FIG. 1, the HDD is assumed to comprise the single disk 11. However, the HDD may comprise a plurality of stacked disks.

Figure 2:
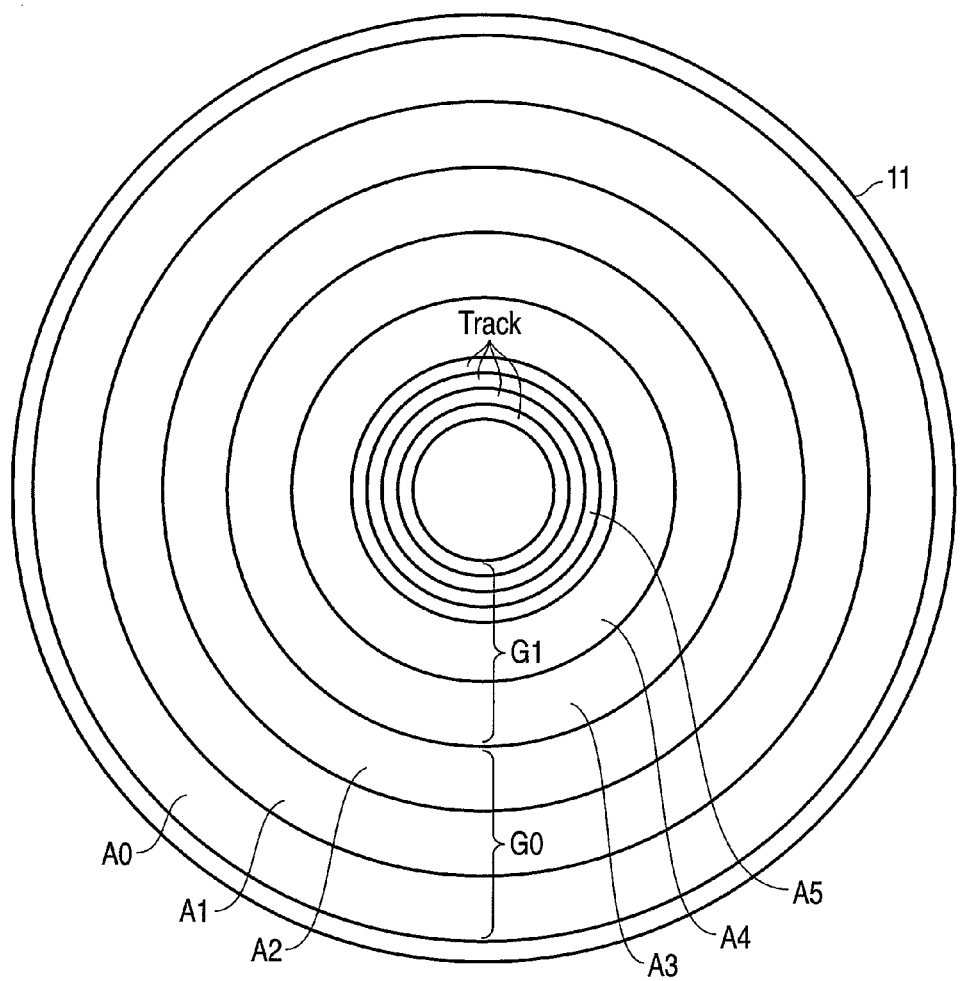
FIG. 2 is a conceptual drawing showing an example of a format including the track arrangement of a disk applied in the first embodiment.

FIG. 2 is a conceptual drawing showing an example of a format including a disk track arrangement and applied in the first embodiment. As shown in FIG. 2, the recording surface of the disk 11 is divided into areas $A_0$ to $A_5$ in the radial direction of the disk 11. A given number of tracks are arranged in each of the areas $A_0$ to $A_5$. For convenience, FIG. 2 shows only tracks arranged in the area $A_5$ located on the inner circumferential side of the disk 11. The tracks arranged in the other areas $A_0$ to $S_4$ are omitted.

Furthermore, in the first embodiment, the areas $A_0$ to $A_5$ are grouped into sets each of a given number of areas. In the example in FIG. 2, a set of the areas $A_0$ to $A_2$ forms a group G0. A set of the areas $A_3$ to $A_5$ forms a group G1. Furthermore, in each group Gi (i=0, 1), one area is assigned as a free space used as a migration destination (rewrite destination) to which data in the tracks in another area in the group Gi is migrated during shingled write. When the data migration (rewrite) is completed, an area corresponding to a data migration source is newly assigned as a free space.

In the example in FIG. 2, the recording surface of the disk is divided into six areas. However, the recording surface may be divided into, for example, more than six areas instead of being divided into six areas. Furthermore, in the example in FIG. 2, each group comprises three areas. However, each group may comprise more than one area, for example, more than three areas.

Figure 3:
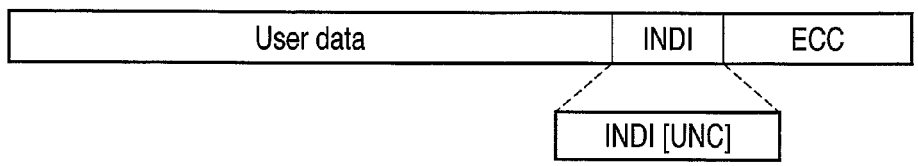
FIG. 3 is a diagram showing an example of a sector data format applied in the first embodiment.

Each of the tracks on the disk 11 comprises a plurality of data sectors (hereinafter simply referred to as sectors). FIG. 3 shows an example of a sector data format. The sector mainly comprises a user data field, an indicator (INDI) field, and an ECC (Error Correction Code) field. The user data field is used to record user data. The indicator field is used to record an indicator INDI indicative of an attribute of the corresponding sector field. The indicator INDI is attribute data including read uncorrectable bit (UNC) indicative of a read uncorrectable attribute. The rewrite of sector data is not limited to the updating of the sector data. For example, the rewrite of sector data also includes write of sector data read from one sector to the same sector again or to another sector corresponding to the one sector.

FIG. 1 is referred to again. The disk 11 is spun at a high speed by a spindle motor (SPM) 13. The head 12 is attached to the tip of an actuator 14. The head 12 floats over the disk 11 as a result of the high-speed spin of the disk 11. The actuator 14 comprises a voice coil motor (VCM) 15 serving as a driving source for the actuator 14. The actuator 14 is driven by VCM 15 to move the head 12 in the radial direction of the disk 11. The operation of the actuator 14 allows the disk 11 to be positioned on a target track on the disk 11.

HDD 10 comprises a controller CNT. The controller CNT provides a host interface control function to control reception of commands (a write command, a read command, and the like) transferred by the host 10 via a host interface 101 and transfer of data between the host 100 and the controller CNT. The controller CNT also provides a disk interface control function to control data transfer between the disk 11 and the controller CNT. The controller CNT also provides a buffer interface control function to control a buffer memory 19 described below.

In the first embodiment, the controller CNT is implemented by a system LSI called SOC (System On Chip) and comprising a read IC 16, an ECC module 17, an indicator module 18, a buffer memory 19, and MPU (Microprocessor Unit) 20 all integrated on a single chip. Such a configuration of the controller CNT is illustrative, and for example, the buffer memory 19 may be provided outside the controller CNT.

The read IC 16 is connected to the head 12 via a head amplifier not shown in the drawings. The head amplifier includes a read amplifier configured to amplify a signal (read signal) reproduced by the head and a write driver configured to convert coded write data transferred by the read IC 16 into a write current (write signal) and then output the write current to the head.

The read IC 16 is a well-known signal processing module called a read channel or a read/write channel. The read IC 16 digitalizes a read signal and decodes read data from the digitalized data (digital data). The read IC 16 also extracts servo data (servo patterns) from the digital data. The read IC 16 also codes write data. The read IC 16 is connected to the ECC module 17.

The ECC module 17 provides an ECC generation function to generate ECC based on user data (more specifically user data with an indicator) transferred by the indicator module 18. The ECC module 17 adds ECC (generated ECC) to user data with an indicator, and transfers the user data with the indicator and the ECC to the read IC 16. The ECC module 17 also extracts the user data and ECC from the decoded read data transferred by the read IC 16. Then, based on the extracted ECC, the ECC module 17 detects and corrects a possible error in the user data. The ECC module 17 is connected to the indicator module 18.

The indicator module 18 operates when a data block (first data block) stored in one area (first area) in the group Gi on the disk is rewritten using another area (free space or second area) in the group Gi. The indicator module 18 adds the indicator INDI to the user data included in each sector data in a data block (second data block) to be written to the second area. The indicator INDI is indicative of an attribute specified by MPU 20. The indicator module 18 also operates when the first data block is read from the first area. The indicator module 18 detects the indicator INDI with a valid read uncorrectable (UNC) bit with a logical "1" in each sector data in the first data block.

The buffer memory 19 is used to temporarily store user data to be written to the disk 11. The buffer memory 19 is also used to temporarily store user data read form the disk 11 via the read IC 16, the ECC module 17, and the indicator module 18.

MPU 20 is a control module configured to control the read IC 16, the ECC module 17, and the indicator module 18 in accordance with a control program stored in ROM or a flash ROM not shown in the drawings. MPU 20 also controls SPM 13 and VCM 15 via a motor driver IC not shown in the drawings.

Now, with reference to FIG. 4, the operation of the first embodiment will be described taking, as an example, data rewrite executed when a write access range specified by the host 100 corresponds to, for example, a series of sectors in the area A0 belonging to the group G0. Here, for simplification of description, it is assumed that the amount of radial shift of the head during shingled write is half of the width W of a write element included in the head 12. Furthermore, it is assumed that the area A2 is assigned as a free space in the group G0.

The above-described data rewrite is executed by read of a data block (first data block) DB stored in the area A0 and write of a data block (second data block) DB' to the area A2. The data block DB' is the read data block DB in which a part of the data block DB corresponding to the above-described write access range is rewritten (that is, modified) with write data specified by the host 100, that is, what is called read modify data. However, in the description below, for simplification, it is assumed that the data block DB is the same as the data block DB'. That is, it is assumed that the data block DB stored in the area (read target area) A0 is migrated to the area (write target area) A2.

FIG. 4 shows an example of migration of a data block from the area A0 to the area A2 executed if the area A0 comprises tracks TR_1 to TR_4 and if the area (free space) A2 comprises tracks TR_N+1 to TR_N+4. The controller CNT reads the data bock DB stored in the area A0 in units of sectors. That is, the controller CNT sequentially reads sector data from all the sectors in the tracks TR_1 to TR_4 provided in the area A0. Every time the sector data is read, the ECC module 17 in the controller CNT extracts the user data and ECC from the read sector data. Then, based on the extracted ECC, the ECC module 17 then detects and corrects a possible error in the used data. The user data with the error detected and corrected by the ECC module 17 is stored in the buffer memory 19 via the indicator module 18.

Here, it is assumed that during the sector-wise read of data from the area A0, a read error occurs in which sector data cannot be read normally from the sector SA on the track TR_3 as shown in FIG. 4. It is then assumed that the read error is of a read uncorrectable type in which an error in the user data included in the sector data read from the sector SA is uncorrectable. In the first embodiment, the logical address (logical block address) of the sector SA is LBA "A".

It is then assumed that when all of the data block DB is read from the area (migration source area) A0, the read data block DB is written to the area (migration destination area) A2. In the first embodiment, the area A2 contains the normal sector SA', and the relative position of the sector SA' in the area A2 coincides with that of the sector SA with a read error. That is, the sector SA' in the area A2 corresponds to the sector SA in the area A0.

When all of the data block DB is written to the area A2, that is, when all of the data block DB is migrated from the area A0 to the area A2, then in the group G0, the free space is switched from the area A2 to the area A0. Furthermore, the assignment destination of the logical block address LBA "A" previously assigned to the sector SA in the area A0 is switched from the sector SA to the sector SA' in the area A2.

Moreover, it is assumed that after the migration of the data block DB is finished, the host 100 instructs the controller CNT in HDD 10 to read data positioned at the logical block address LBA "A". In this case, the controller CNT reads the data in the sector SA' in the area A2 as the data positioned at the logical block address LBA "A". Since the sector SA' is normal, it is very likely that the data read is achieved normally. In such a case, the data read from the sector SA' is different from that stored in the sector SA. Thus, incorrect data (sector data) may be returned to the host 100 by the controller CNT as normal data positioned at the specified logical block address LBA "A".

If the sector SA' is temporarily entered, for example, in an existing defect management table in order to avoid the above-described situation, the controller CNT can process the sector SA' based on the recognition that the sector SA' corresponds to an originally read-uncorrectable special sector. However, application of this method may even temporarily increase the number of sectors entered in the defect management table (that is, the number of sectors to be managed). Furthermore, if the defect management table is filled with the many temporarily entered sectors, even when a real defective sector is newly detected, it is difficult to enter the real defective sector in the defect management table.

Thus, in the first embodiment, if sector data including one of the user data stored in the buffer memory 19 for which a read operation has resulted in an error is written to the sector SA', the indicator module 18 in the controller CNT adds the indicator INDI to the user data for which the read operation has resulted in the error. The indicator INDI includes, for example, an instruction bit UNC with a logical "1". The instruction bit UNC with a logical "1" indicates that the sector SA' to which the sector data including the indicator INDI is to be written corresponds to a special sector on which normal data read can originally not be executed (that is, the special sector for which the read data is uncorrectable). In the description below, the instruction bit UNC is expressed as the INDI [UNC] bit or INDI [UNC]. The instruction bit UNC with the logical "1" is expressed as "INDI [UNC]=1".

The ECC module 17 generates ECC based on the user data provided with the indicator INDI (more specifically, the indicator INDI with the INDI [UNC] bit) by the indicator module 18. The ECC module 17 adds the generated ECC to the user data provided with the indicator INDI. The ECC module 17 transfers the sector data including the user data provided with the indicator INDI and ECC, to the read IC 16 as write data. The read IC 16 codes the write data transferred by the ECC module 17. The write data coded by the read IC 16 is converted into a write current by the head amplifier. Based on the write current, the write data is written to the corresponding sector, that is, the sector SA', by the head 12.

FIG. 4 also shows that the write data (sector data) with "INDI [UNC]=1" is written to the sector SA' in the area A2 on the disk 11. If such write data (sector data) with "INDI [UNC]=1" (that is, the write data in which "INDI [UNC]=1" is embedded) is read, the indicator module 18 makes determination equivalent to that made by the ECC module 17. Thus, the indicator module 18 detects "INDI [UNC]=1" in the read sector data to determine that the sector SA' in which the sector data is stored is a special sector from which the data cannot be read normally (the read data is uncorrectable). Thus, in the first embodiment, the attribute of the sector SA for which a read operation has resulted in an error is indicated by "INDI [UNC]=1" in the indicator INDI added to the user data written to the sector SA' to which the data in the sector SA is migrated.

When the indicator module 18 detects "INDI [UNC]=1" in the read sector data, MPU 20 in the controller CNT executes error processing similar to that executed if a read error is detected in the ECC nodule 17. That is, even if sector data is read normally from the sector SA', MPU 20 can execute error processing in the same manner as that used if the read error is uncorrectable. Furthermore, in the first embodiment, such a special sector SA' need not be manageably stored in a special table such as the defect management table.

Additionally, if the data block written to the area A2 to which the sector SA' belongs is migrated to the free space in the group G0 to which the area A2 belongs, the controller CNT may copy the sector data in the sector SA' including "INDI [UNC]=1" to the corresponding sector in the free space without any change. This enables the attribute of the sector A to be inherited from the sector SA' to the sector to which the sector data is migrated without the need to execute the process of adding "INDI [UNC]=1".

Figure 5:
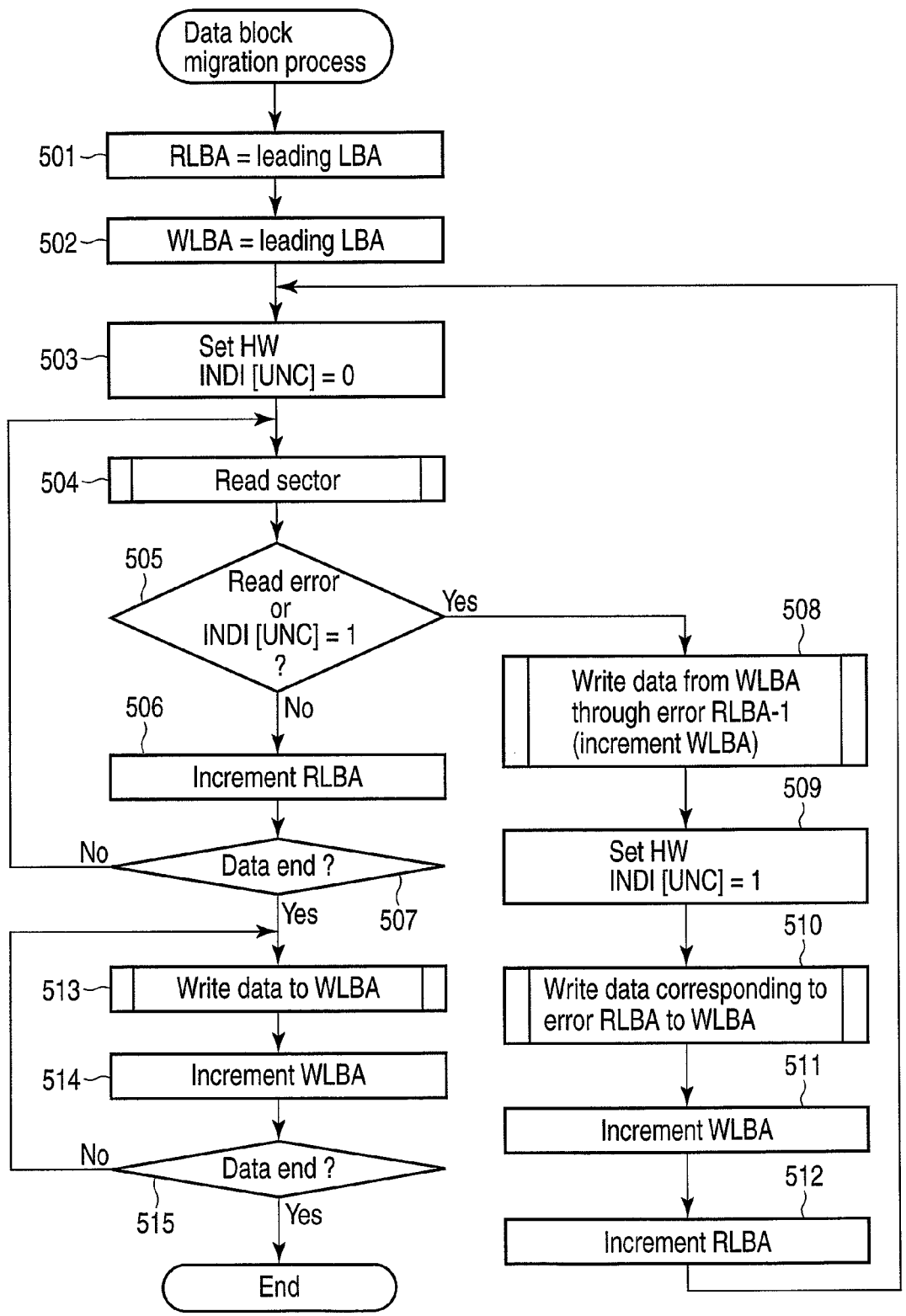
FIG. 5 is a flowchart showing an exemplary procedure of a data block migration process applied in the first embodiment.

Now, the procedure of the data block migration process applied in the first embodiment will be described with reference to the flowchart in FIG. 5 taking, as an example, the case in which the data block DB is migrated from the area A0 to the area A2 serving as a free space. First, MPU 20 in the controller CNT sets a read logical block address RLBA specifying a read target sector (migration source sector) in the area (read target area) A0, to be a logical block address assigned to the leading sector in the area A0 (block 501). The logical block address assigned to the leading sector in the area A0 is the leading logical block address (leading LBA) in the area A0. Furthermore, MPU 20 sets a write logical block address WLBA specifying a sector (migration destination sector) in the area (write target area) A2 to which the sector data is to be written, to be the leading LBA which is a logical block address to be assigned to the leading sector in the area A2 (block 502).

Then, MPU 20 sets the indicator module 18 to a first mode in which the indicator module 18 adds the indicator INDI including the INDI [UNC] bit with a logical "0" (that is, INDI [UNC]=0) to the user data (block 503). MPU 20 then executes sector read to read sector data from the sector in the area A0 indicated by the current read logical block address RLBA (block 504). The sector data read by the sector read is decoded by the read IC 16. The sector data decoded by the read IC 16 is transferred to the ECC module 17.

The ECC module 17 extracts the user data, indicator INDI, and ECC from the sector data (read data) transferred by the read IC 16. Then, based on ECC, ECC module 17 detects and corrects a possible error in the user data to determine whether or not a read error has occurred. Here, for simplification of description, a read retry operation is omitted. However, if sector data cannot be correctly read from the sector indicated by RLBA, a read operation of reading sector data from the sector is generally retried. If the sector data cannot be correctly read even with a given number of retries, that is, if the error in the user data is uncorrectable, a read error is determined. The result of the determination made by the ECC module 17 is communicated to MPU 20.

ECC module 17 transfers the extracted user data and indicator INDI to the indicator module 18. The indicator module 18 determines whether or not the INDI [UNC] bit in the indicator INDI is "1" (IND1 [UNC]=1). The indicator module 18 then communicates the result of the determination to MPU 20. The indicator module 18 stores the user data provided with the indicator NDI in the buffer memory 19. Here, in the same sequence in which the sector data is read in block 504, the corresponding user data is stored in the buffer memory 19.

Based on the results of the determinations made by the ECC module 17 and the indicator module 18, MPU 20 determines whether a read error has been detected or "INDI [UNC] =1" has been detected (block 505). If neither a read error nor "INDI [UNC]=1" has been detected (No in block 505), MPU 20, for example, increments the current RLBA by one in order to specify the next read target sector (block 506).

MPU 20 determines whether or not the sector read has been executed up to the end (that is, the final sector in the area A0) of the data block DB to be migrated, based on the incremented RLBA (block 507). If the sector read has not been executed up to the end of the data block DB (No in block 507), MPU 20 executes the sector read again (block 504). On the other hand, if a read error or "INDI [UNC]=1" has been detected (Yes in block 505), MPU 20 proceeds to block 508. The read logical block address RLBA where a read error or "INDI [UNC]=1" is detected is hereinafter referred to as an error RLBA.

In block 508, MPU 20 executes a data write process of writing (migrating) the user data stored in the buffer memory 19 and corresponding to the logical block addresses from WLBA through the "error RLBA-1" (that is, the normally read user data), to the corresponding sectors in the area A2 in units of sectors (block 508).

In this data write process (block 508), the indicator module 18 sequentially reads the user data corresponding to the logical block addresses from WLBA through the "error RLBA-1", from the buffer memory 19. The indicator module 18 has been set to the first mode. In this case, the indicator module 18 adds the indicator INDI with "INDI [UNC]=0" (INDI [UNC] with the logical "0"), to the read user data. However, in the description below, for simplification, it is assumed that except when the indicator INDI needs to be distinguished from the INDI [UNC] bit included in the indicator INDI, the INDI [UNC] bit (here, the INDI [UNC] bit with the logical "0") is added to the user data. That is, it is assumed that the sector data comprises the user data, the INDI [UNC] bit and EEC. The indicator module 18 transfers the user data provided with the INDI [UNC] bit with the logical "0" (that is, INDI [UNC] =0), to the ECC module 17.

The ECC module 17 generates an ECC based on the user data transferred by the indicator module 18 and provided with "INDI [UNC]=0". The ECC module 17 adds the generated ECC to the user data provided with "INDI [UNC]=0". The ECC module 17 transfers the sector data including the user data provided with "INDI [UNC]=0" and ECC, to the read IC 16 as write data. The write data is written to the corresponding sector in the area A2 by the head 12 via the read IC 16 and the head amplifier. In accordance with this write, the write logical block address WLBA is incremented by one. Thus, when the data write process (block 508) is finished, the write logical block address WLBA equals the current read logical block address RLBA, that is, the error RLBA.

When the data write process (block 508) is finished, MPU 20 sets the indicator module 18 to a second mode in which the indicator module 18 adds the INDI [UNC] bit with the logical "1" (that is, INDI [UNC]=1) to the user data (block 509). Then, MPU 20 executes data write for writing the user data stored in the buffer memory 19 and corresponding to the error RLBA (that is, the user data determined to involve a read error or INDI [UNC]=1), to the corresponding sector (that is, the sector in the area A2 which is indicated by WLBA matching the error RLBA) in the area A2 (block 510).

In this data write (block 510), the indicator module 18 reads the user data corresponding to the error RLBA from the buffer memory 19. The indicator module 18 has been set to the second mode. In this case, the indicator module 18 adds "INDI [UNC]=1" to the read user data. Thus, in the data write (block 510), the sector data including the user data provided with "INDI [UNC]=1" and ECC is written to the sector in the area A2 which is indicated by WLBA matching the error RLBA. Upon finishing the data write (block 510), MPU 20 increments each of the write logical block address WLBA and the read logical block address RLBA by one (blocks 511 and 512). Then, MPU 20 returns to block 5503.

On the other hand, if the sector read has been executed up to the end of the data block DB (Yes in block 507), MPU 20 executes data write for writing the sector data to the sector indicated by the current write logical block address WLBA (block 513). In this data write (block 513), the indicator module 18 reads the user data corresponding to the logical block address WLBA from the buffer memory 19. In this case, the indicator module 18 adds "INDI [UNC]=0" to the read user data. Thus, in the data write (block 513), the sector data including the user data provided with "INDI [UNC]=0" and ECC is written to the sector in the area A2 which is indicated by the logical block address WLBA.

Upon finishing the data write (block 513), MPU 20 increments the write logical block address WLBA by one (block 514). MPU 20 then determines whether or not the data write has been executed up to the end (that is, the final sector in the area A2) of the data block DB, based on the incremented WLBA (block 515). If the data write has not been executed up to the end of the data block DB (No in block 515), MPU 20 executes the data write again (block 513). In contrast, if the data write has been executed up to the end of the data block DB (Yes in block 515), MPU 20 terminates the data block migration process.

Now, the procedure of a data read process applied in the first embodiment will be described with reference to a flowchart in FIG. 6. First, it is assumed that the host 100 issues a read command specifying read of a certain data block (data) to the controller CNT in HDD 10. The data block is specified by a read access range indicated by the leading logical block address (leading LBA) of the data block and the data length (for example, the number of sectors) of the data block.

MPU 20 in the controller CNT sets the read logical block address RLBA specifying the read target sector to be the leading LBA of the read access range (block 601). Then, MPU 20 executes sector read for reading sector data from the sector indicated by the current read logical block address RLBA (block 602).

Based on the ECC included in the sector data, the ECC module 17 detects and corrects a possible error in the user data included in the sector data read by the sector read. By detecting and correcting a possible error in the user data, the ECC module 17 determines whether or not a read error such as a read uncorrectable error has occurred. The indicator module 18 determines whether or not the INDI [UNC] bit included in the read sector data is "1" (INDI [UBC]=1). MPU 20 determines whether or not "INDI [UNC]=1" has been detected, based on the result of the determination made by the indicator module 18 (block 603). MPU 20 also determines whether or not a read error has been detected, based on the results of the determination made by the ECC module 17 (block 604).

If "INDI [UNC]=1" has not been detected (No in block 603) and no read error has been detected (No in block 604), MPU 20, for example, increments RLBA by one and proceeds to block 605. In block 605, MPU 20 determines whether or not there remains any data to be read. If there remains any data to be read (Yes in block 605), MPU 20 returns to block 602 to execute the sector read again. In contrast, if there remains no data to be read (No in block 605), that is, if the sector read has been executed up to the end of the specified data block, MPU 20 proceeds to block 606. In block 606, MPU 20 executes a normal termination process for reporting to the host 100 that the execution of the read command has been finished normally.

On the other hand, if "INDI [UNC]=1" has been detected (Yes in block 603) or if a read error has been detected (Yes in block 604), MPU 20 proceeds to block 607. In block 607, MPU 20 executes error processing for reporting to the host 100 that an error has occurred during the execution of the read command from the host 100.

Thus, in the first embodiment, even if no read error has been detected during the read of the sector data from the sector (physical sector) specified by RLBA, that is, even if the sector data has been read normally, when the INDI [UNC] bit is "1" (INDI [UNC]=1), error processing is executed in the same manner as that used if a read error is detected. For example, if the physical sector specified by RLBA is the sector SA' shown in FIG. 4, error processing is executed because even though the sector data itself stored in the sector SA' can be read normally, the sector data includes "INDI [UNC]=1". The reason for this is as follows: even though the data itself stored in the sector SA' specified by RLBA (the sector SA' to which RLBA is assigned) can be read normally, the sector SA to which RLBA is previously assigned cannot be read. That is, the data written to the sector SA' to which the data in the sector SA is directly or indirectly migrated (in this case, the direct migration destination) is different from the data stored in the sector SA and is invalid.

That is, according to the first embodiment, in an HDD configured to controllably rewrite a data block with a certain length and typified by an HDD to which shingled write is applied, the indicator INDI including the INDI [UNC] bit indicative of the read uncorrectable property is embedded in each sector data written to the disk. That is, if the sector data for which a read operation has resulted in an error is included in the data block not rewritten yet, the attribute information (pending information) indicating the inclusion and relating to the rewrite of the sector is embedded in the sector data in the write destination. Thus, even if the physical position of the sector in which the sector data is stored is changed, this information can be inherited. This eliminates the need to manage the information using, for example, a management table.

Second Embodiment

Now, a second embodiment will be described with reference to FIG. 1. That is, the configuration (hardware configuration) of a magnetic disk drive (HDD) according to the second embodiment is the same as that according to the first embodiment. Furthermore, shingled write is applied to HDD 10. The second embodiment is different from the first embodiment in the configuration of an indicator INDI.

FIG. 7 shows an example of a sector data format applied in the second embodiment. As in the case of the first embodiment, the sector mainly comprises a user data field, an indicator (INDI) field, and an ECC field. In the second embodiment, the indicator INDI added to user data includes a write count (N). In this regard, the second embodiment is different from the first embodiment in which the indicator INDI includes the INDI [UNC] bit (write uncorrectable bit). Because of this difference, a data block migration process and a data read process applied in the second embodiment involve procedures different from those in the first embodiment. In the description below, it is assumed that for simplification, the write count (N) is added to the user data except when the indicator INDI needs to be distinguished from the write count (N) included in the indicator INDI. That is, it is assumed that sector data comprises the user data, the write count (N), and ECC. The write count is expressed as INDI [N].

Figure 8:
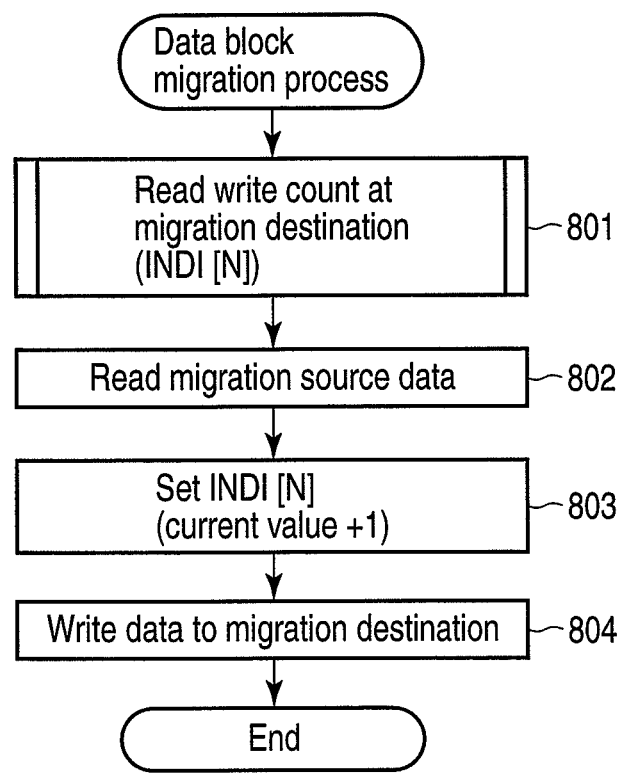
FIG. 8 is a flowchart showing an exemplary procedure of a data block migration process applied in the second embodiment.

The procedure of the data block migration process applied in the second embodiment will be described below with reference to a flowchart in FIG. 8. By way of example, a data block DB is migrated from an area A0 to an area A2 as in the case of the first embodiment. It is assumed that the data block migration process has been executed up to the final sector without power shutdown; in the data block migration process, a data block is migrated from a certain area (migration source area) to another area (migration destination area) A2 in a group G0. Alternatively, it is further assumed that even when power shutdown occurs during the data block migration process, a data recovery process described below is executed to completely migrate the data from a sector where the process (data write) has been suspended as a result of the power shutdown to the final sector in the area A2. In any case, INDI [N] (write count) contained (embedded) in the sector data stored in all the sectors in the area A2 is equal.

Thus, MPU 20 reads sector data from, for example, the leading sector in the area (migration destination area) A2 to acquire INDI [N] from the sector data (block 801). Furthermore, given that the INDI [N] has a value n, INDI [N] with the value n is expressed as "INDI [N]=n". Then, MPU 20 executes migration source data read for reading the data block DB stored in the area (migration source area) A0, for example, in units of sectors (block 802). The user data in the sector data read as a result of the migration source data read is sequentially stored in a buffer memory 19.

Then, MPU 20 adds 1 to INDI [N] (=n) acquired in block 801 (INDI [N]=n+1), and sets "INDI [N]=n+1", which corresponds to NDI [N] (=n) to which 1 has been added, in an indicator module 18 (block 803). MPU 20 thus instructs the indicator module 18 to add "INDI [N]=n+1" to the user data. Then, MPU 20 executes data write for writing (migrating) the sector data including the user data sequentially stored in the buffer memory 19 in the migration source data read (block 802), to the area (migration destination area) A2 (block 804). In this data write (block 804), the indicator module 18 sequentially reads the user data stored in the buffer memory 19 during the migration source data read (block 802). The indicator module 18 adds "INDI [N]=n+1" set by MPU 20 in block 803, to the read user data.

An ECC module 17 generates ECC based on the user data to which "INDI [N]=n+1" has been added. The ECC module 17 adds the generated ECC to the user data to which "INDI [N]=n+1" has been added. The ECC module 17 transfers the sector data including the user data provided with "INDI [N]=n+1" and ECC, to a read IC 16 as write data. The write data is written to the corresponding sector in the area A2 by a head 12 via the read IC 16 and a head amplifier. Thus, if the data block migration process is executed up to the final sector without power shutdown, the sector data written (migrated) to each of all the sectors in the area A2 includes the same INDI [N]=n+1". That is, for all the sectors in the area A2, INDI [N] (write count) is "n+1".

In contrast, if power to HDD 10 is shut down during the data block migration process, INDI [N] (write count) is "n+1" for each of the sectors from the leading sector in the area A2 through a sector preceding the one where the power shutdown has occurred. However, INDI [N] (write count) is "n" for each of the sectors from a sector succeeding the one where the power shutdown has occurred through the final sector. FIG. 9 shows such a case in which the sector where the power shutdown has occurred is located on a track TR_N+2 in the area A2. As is apparent from FIG. 9, by utilizing the difference in INDI [N] (write count), the process can determine whether or not the power shutdown has occurred during the data block migration process and further identify the sector where the process has been suspended as a result of the power shutdown.

Figure 10:
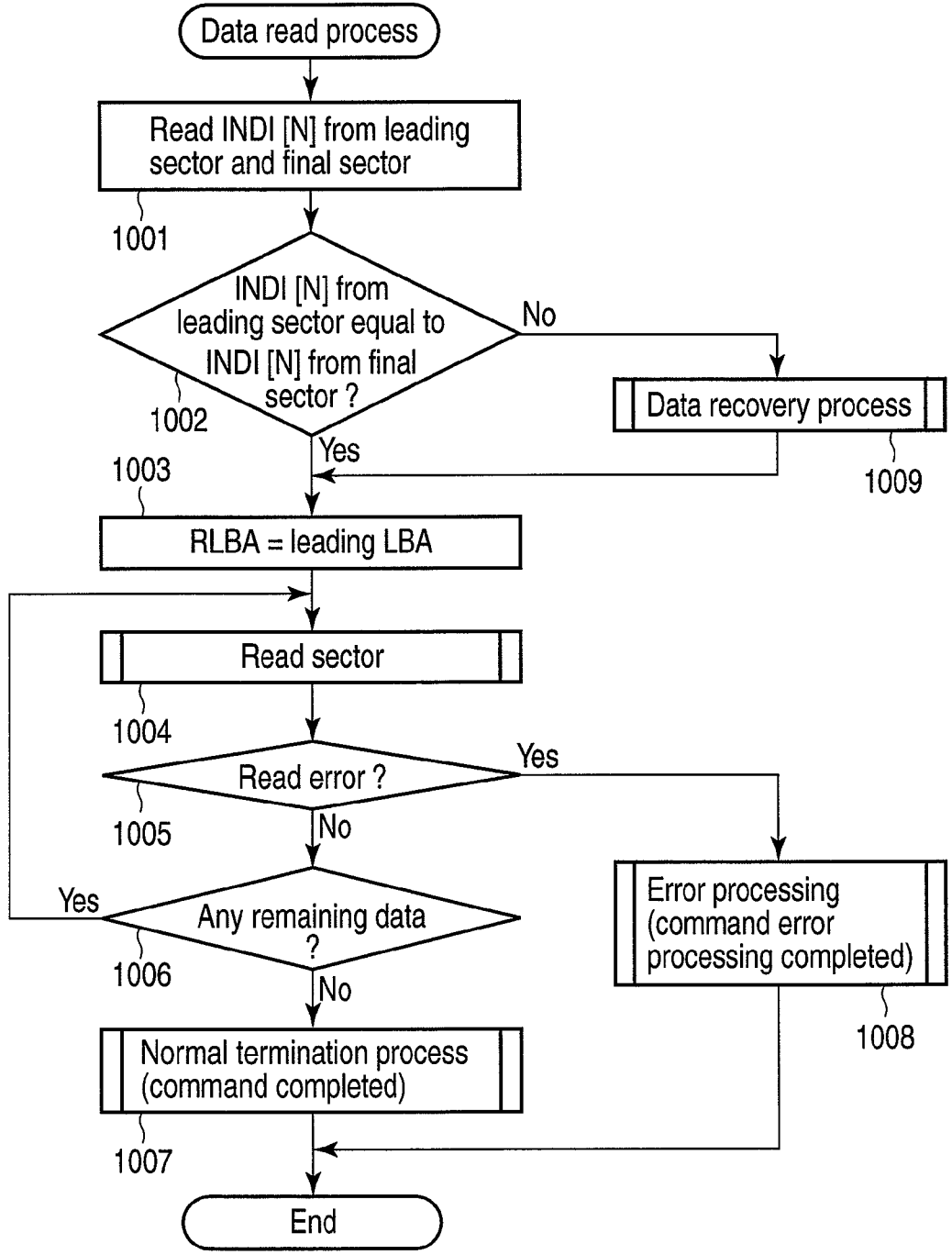
FIG. 10 is a flowchart showing an exemplary procedure of a data read process applied in the second embodiment.

Now, the procedure of the data read process applied in the second embodiment will be described with reference to a flowchart in FIG. 10. First, it is assumed that a host 100 issues a read command specifying read of a certain data block, to a controller CNT in HDD 10. It is assumed that the area to which the read access range indicated by the read command belongs is the area A2.

MPU 20 in the controller CNT reads sector data from, for example, the leading sector and final sector in the area A2 to which the read access range belongs, to acquire INDI [N] (write count) from the sector data in the leading and final sectors (block 1001). In the description below, such reading of sector data for acquisition of INDI [N] is expressed as reading of INDI [N] for simplification. Here, INDI [N] for the leading sector is assumed to be n1 (INDI [N]=n1). INDI [N] for the final sector is assumed to be n2 (INDI [N]=n2).

MPU 20 determines whether or not "INDI [N]=n1" is equal to "INDI [N]=n2" (block 1002). If "INDI [N]=n1" is equal to "INDI [N]=n2" (Yes in block 1002), MPU 20 determines that the data migration process of migrating a data block from a certain area (for example, A0) to the area A2 has been completed normally. MPU 20 then proceeds to block 1003. This normal completion includes the completion, by a data recovery process described below, of a data migration process suspended as a result of power shutdown.

In block 1003, MPU 20 sets a read logical block address RLBA specifying a read target sector to be the leading LBA of the read access range. Then, MPU 20 executes sector read for reading sector data from a sector indicated by the current read logical block address RLBA (block 1004). Based on the ECC included in the sector data, the ECC module 17 detects and corrects a possible error in the user data included in the sector data read by the sector read. The ECC module 17 thus determines whether or not a read error has occurred. The result of the determination made by the ECC module 17 is communicated to MPU 20.

Based on the result of the determination made by the ECC module 17, MPU 20 determines whether or not a read error has been detected (block 1005). If no read error has been detected (No in block 1005), MPU 20, for example, increments RLBA by one and then proceeds to block 1006. In block 1006, MPU 20 determines whether or not there remains any data to be read. If there remains any data to be read (Yes in block 1006), MPU returns to block 1004 to execute the sector read again. In contrast, if there remains no data to be read (No in block 1006), MPU 20 executes a normal termination process (block 1007). Furthermore, if a read error has been detected (Yes in block 1005), MPU 20 executes error processing (block 1008).

On the other hand, if "INDIK [N]=n1" is not equal to "INDI [N]=n2" (No in block 1002), MPU 20 determines that for example, power shutdown has occurred during the data block migration process of migrating the data block from the area A0 to the area A2 to prevent the data block migration process from being completed normally. In this case, MPU 20 executes the data recovery process described below (block 1009).

At the beginning of the data recovery process, MPU 20 identifies the sector where the process has been suspended as a result of the power shutdown. The technique to identify the sector where the process has been suspended as a result of the power shutdown will be described with reference to FIG. 9. MPU 20 first reads INDI [N] (write count) from the leading and final sectors on the leading track TR_N+1 in the area A2. MPU 20 compares INDI [N] read from the leading sector with INDI [N] read from the final sector to determine whether or not these two write counts are equal. In the example in FIG. 9, both INDI [N] read from the leading sector and INDI [N] read from the final sector are "n+1" and are thus equal. In this case, MPU 20 determines that the data migration to the track TR_N+1 has been completed normally.

Then, MPU 20 reads INDI [N] from the leading and final sectors on the second track TR_N+2 in the area A2. MPU 20 compares INDI [N] read from the leading sector on the track TR_N+2 with INDI [N] read from the final sector on the track TR_N+2 to determine whether or not these two write counts are equal. In the example in FIG. 9, INDI [N] read from the leading sector on the track TR_N+2 is "n+1", and INDI [N] read from the final sector on the track TR_N+2 is "n". Thus, INDI [N] read from the leading sector on the track TR_N+2 is not equal to INDI [N] read from the final sector on the track TR_N+2. In this case, MPU 20 determines that the power shutdown has occurred during data migration to the track TR_N+2. If the next track (TR_N+3) is present as in the case of the track TR_N+2, INDI [N] may be read from the leading sector on the track TR_N+2 and the leading sector on the next track. Then, MPU 20 reads INDI [N] from the second sector on the track TR_N+2. MPU 20 determines whether or not INDI [N] (=n+1) in the leading sector on the track TR_N+2 is equal to INDI [N] in the second sector on the track TR_N+2.

MPU 20 repeats the above-described operation while sequentially switching the read target sector on the track TR_N+2 until MPU 20 detects INDI [N] that is not equal to INDI [N] (=n+1) in the leading sector. In the second embodiment, it is assumed that when INDI [N] is read from a sector SB shown in FIG. 9, INDI [N] (=n) that is not equal to INDI [N] (=n+1) in the leading sector is detected. In this case, MPU 20 determines the sector SB to be where the process has been suspended as a result of the power shutdown during the data block migration process.

Detecting the equality between INDI [N] in the leading sector and INDI [N] in the final sector on the track is not necessarily required. To omit this detection, MPU 20 may repeat the operation of comparing INDI [N] (=n+1) in the leading sector in the area A2 (that is, the leading sector on the track TR_N+1) with INDI [N] in the sectors in the area A2 in order starting with the area A2, until MPU 20 detects INDI [N] that is not equal to INDI [N] (=n+1) in the leading sector. That is, MPU 20 may read INDI [N] from the sectors in the area A2 in order starting with the leading sector to detect the first sector with the value of INDI [N] different from that of INDI [N] (=n+1) in the leading sector.

It is assumed that MPU 20 detects the sector SB on the sector track TR_N+2 where the process has been suspended as a result of the power shutdown during the data block migration process. In this case, MPU 20 executes a process for recovering the data in the sectors from the sector SB through the final sector on the track TR_N+4 (that is, the final sector in the area A2) utilizing the data in the corresponding sectors in the area A0. That is, MPU 20 executes a data migration process for migrating the data in the sectors in the area A0 to the corresponding sectors from the sector SB through the final sector on the track TR_N+4 (the data migration process has been suspended by the power shutdown). In the data migration process, INDI [N] with the value "n+1", obtained by incrementing "n" by one, is contained in the sector data migrated to the sectors from the sector SB through the final sector in the area A2. Upon finishing the data recovery process (block 1009), MPU 20 proceeds to block 1003.

In the second embodiment, as is the case with the first embodiment, one of a plurality of areas belonging to a group is assigned as a free space. The free space is utilized to execute data migration in units of areas. In this case, the data migration can be achieved at a high speed. However, one free space is required for each group, reducing the utilization efficiency of the storage areas in the group. Thus, on each track, data may be rewritten, for example, in units of sectors.

In HDD 10 to which shingled write is applied, if for example, the data in the first track is rewritten, at least one track is affected by the rewrite of the data in the first track. Here, it is assumed that the second track is affected by the rewrite of the data in the first track. In this case, before the rewrite of the data in the first track is started, the data in each of the sectors of the second track needs to be saved (migrated) to, for example, a temporary save area.

When the rewrite of the data in the first track is completed, a rewrite process can be executed which writes the data in the second track temporarily saved to the temporary save area, to the second track again. The data in the second track is manageably saved to the temporary save area at least until the rewrite process is completed. The rewrite of the data in the second track is started after the data in each of the sectors of, for example, the third track, which is affected by the rewrite of the second track, is temporarily saved to the temporary save area.

If power shutdown occurs during the rewrite of the data in the second track, the sector where the process has been suspended as a result of the power shutdown can be identified by a technique similar to that according to the first embodiment. In this case, the rewrite process can be resumed using the data in the sectors from the identified sector through the final sector of the second track.

In the second embodiment, the indicator INDI in each sector data includes the write count (INDI [N]). In the data block migration process, a value is used which is obtained by incrementing the write count (obtained before the migration of the data block) common to the sectors in the migration destination area. The value obtained by incrementing the write count need not necessarily be used. A value different from the write count obtained before the data migration (before the data rewrite) may be used. That is, instead of the write count, an attribute value indicative of the attribute of the rewrite may be used. In the data block migration process, an attribute value different from that obtained before the data migration may be used.

As described above, in the second embodiment, the attribute value indicative of the attribute of rewrite, such as the write count (INDI [N]), is included in the indicator INDI embedded in each sector data. Thus, if power shutdown occurs during the rewrite of a data block, the sector where the process has been suspended as a result of the power shutdown can be easily identified.

Third Embodiment

Now, a third embodiment will be described with reference to FIG. 1. That is, it is assumed that the configuration of a magnetic disk drive (HDD) 10 according to the third embodiment is the same as those of the first and second embodiments. It is also assumed that shingled write is applied to HDD 10 as is the case with the first and second embodiments and that an indicator INDI with a write count (INDI [N]) is applied as is the case with the second embodiment.

Differences between the third embodiment and the second embodiment will be described with reference to the drawings. In the third embodiment, a predetermined area on a disk 11 is used as a temporary storage area (cache area) in which write data is temporarily stored. The temporary storage area is hereinafter referred to as a nonvolatile cache area. The nonvolatile cache area is assumed not to belong to the group G0 or G1.

Figure 11:
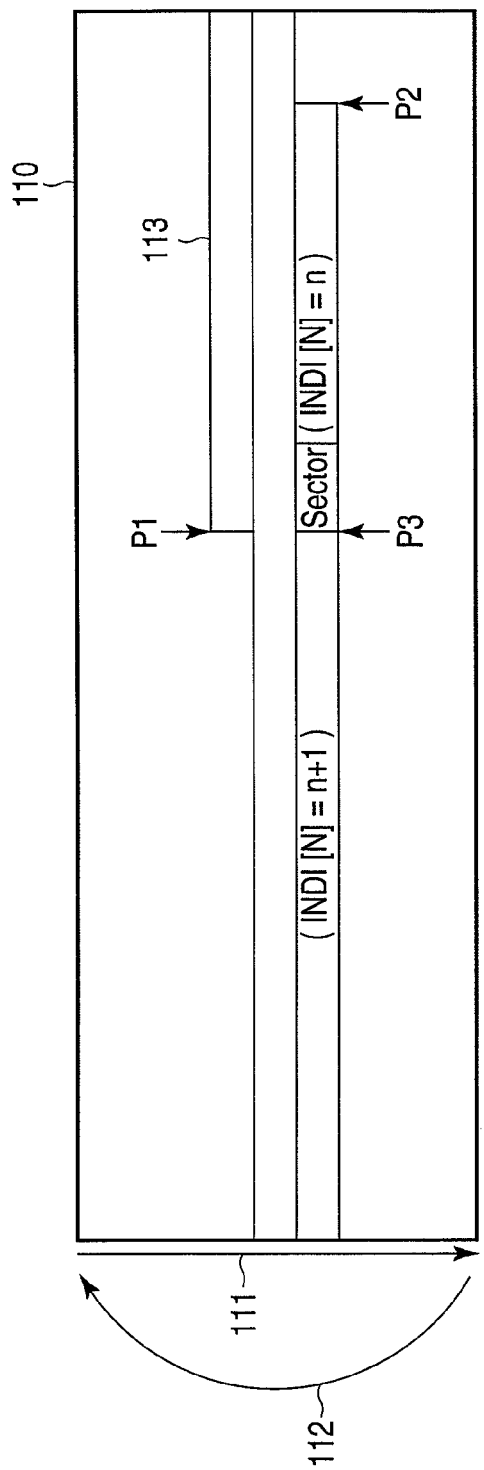
FIG. 11 is a diagram illustrating an exemplary write of write data to a nonvolatile cache area reserved on the disk.

FIG. 11 shows that write data (data block) specified by a write command from a host 100 is partly stored in a nonvolatile cache area 110 reserved on the disk 11. MPU 20 sequentially writes (temporarily stores) the write data transferred by the host 100 to the nonvolatile cache area 110 via a buffer memory 19. At this time, MPU 20 cyclically uses the portions of the nonvolatile cache area 110 in order starting from the leading position in a first-in first-out (FIFO) manner as shown by arrows 111 and 112. That is, the nonvolatile cache area 110 is used as a ring buffer that utilizes FIFO. MPU 20 writes write data temporarily stored in the nonvolatile cache area 110, to an original write access range specified by MPU 20.

In HDD 10 to which shingled write is applied, even if for example, write of data contained in one track is specified by a write command from the host 100, the data in all the tracks in the area to which the one track belongs needs to be rewritten. That is, the data block migration process as applied in the first and second embodiments is required. In this case, when the data block migration process is completed, the completion of the write command is reported to the host 100. This degrades command responses.

In contrast, if write data specified by a write command from the host 100 is written to the nonvolatile cache area 110 utilizing FIFO, the write data can be temporarily stored in the nonvolatile cache area 110 at a high speed. In this case, at the moment when all of the specified write data is written to the nonvolatile cache area 110, the completion of the write command can be reported to the host 100. This improves command responses.

The write data temporarily stored in the nonvolatile cache area 110 is sequentially read utilizing FIFO as is the case with read from the buffer memory 19. The write data is then written to the write access range on the disk 11 specified by the corresponding write command. The write is implemented by such a data block migration process as applied in the first and second embodiments in order to migrate the data block located in the area to which the write access range belongs (more specifically, the data block obtained by replacing the data located within the write access range with write data) to a free space.

In the third embodiment, even when the specified write data is written to the nonvolatile cache memory 110, INDI [N] with an incremented value is embedded in the sector data. In FIG. 11, positions P1 and P2 on the nonvolatile area 110 correspond to the leading (start) and trailing (final) ends, respectively, of an area portion 113 in the nonvolatile area 110 in which the specified write data (data block) is to be temporarily stored.

In the example in FIG. 11, a part of the specified write data has been written from a sector located at a position P1 through a sector located immediately before a position P3 between the positions P1 and P2. Furthermore, in FIG. 11, it is assumed that before the start of an operation of writing the specified write data to the relevant sectors starting with the sector located at the position P1, the write count (INDI [N]) embedded in each of the sectors from the one located at the position P1 through the one located immediately before the position P3 is "n" (INDI [N]=n). In this case, when a part of the specified write data is written from the sector located at the position P1 through the sector located immediately before the position P3, the write count (INDI [N]) embedded in each of the sectors from the one located at the position P1 through the one located immediately before the position P3 is "n+1" (INDI [N]=n+1).

Unlike normal areas on the disk 11, the sectors in the nonvolatile cache area 110 do not have any sequentially assigned LBA. Thus, the position of the write data stored in the nonvolatile cache area 110 in accordance with the write command from the host 100 fails to correspond to the position indicated by LBA specified by the write command. Hence, the position of the write data in the nonvolatile cache area 110 needs to be manageably associated with LBA indicative of the write destination of the write data, for example, in a management table.

Furthermore, for HDD to which the nonvolatile cache area 110 is applied, possible power shutdown during write of write data to the nonvolatile cache 110 area needs to be taken into account. Thus, for example, the management table may be updated when all of the write data is written to the nonvolatile cache area 110. Additionally, sector data indicative of completion of write may be written after the end of the write data (the final sector of the write data). However, this technique fails to determine which of the sectors as counted from the leading write data corresponds to the occurrence of power shutdown during data write. Thus, all of the write data is lost.

On the other hand, in an HDD of a type in which write data is written directly to the position of LBA specified by the write command without the use of the nonvolatile cache area 110 (this HDD is hereinafter referred to as the current HDD), if power shutdown occurs during the write of the write data, the data has been updated which is stored up to the sector preceding the one where the process has been suspended as a result of power shutdown. That is, none of the data stored up to the sector preceding the one where the process has been suspended is lost. In this manner, the HDD behaves differently between the case where the nonvolatile cache area 110 is used and the case where the nonvolatile cache area 110 is not used. However, in the third embodiment, the write count (INDI [N]) is embedded in the data written to the nonvolatile cache area 110, in units of sectors as is the case with the second embodiment. Thus, as described below, loss of all of such write data as described above can be avoided.

It is assumed that power shutdown occurs while the appropriate sector data in the write data is being written to the sector located immediately after the position P3 shown in FIG. 11. In this case, as is the case with the second embodiment, a difference can be detected between the write counts (INDI [N]) obtained before and after the sector where the process has been suspended as a result of the power shutdown. That is, the sector where the process has been suspended as a result of the power shutdown can be identified. Thus, the integrity of the data located up to the sector preceding the one where the process has been suspended can be ensured. This enables behavior equivalent to that of the current HDD.

Figure 12:
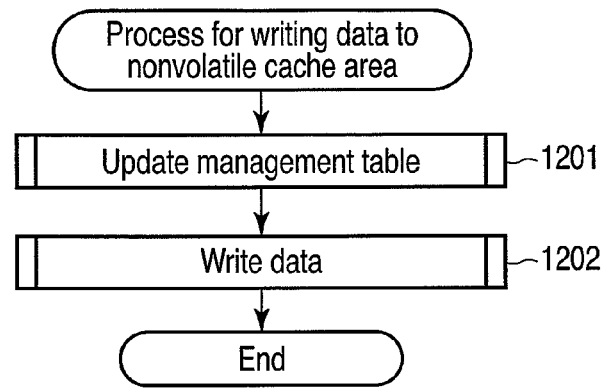
FIG. 12 is a flowchart showing an exemplary procedure of a process of writing data to the nonvolatile cache area which process is applied in a third embodiment.

Now, the procedure of a data write process for writing data to the nonvolatile cache area 110 which process is applied in the third embodiment will be described with reference to a flowchart in FIG. 12. It is assumed that the host 100 issues a write command specifying data write to a controller CNT in HDD 10 and that the write data specified by the write command is stored in the buffer memory 19.

MPU 20 updates a management table (block 1201) before writing the write data stored in the buffer memory 19 to the nonvolatile cache area 110 on the disk 11. The update allows the position in the nonvolatile cache area 110 to which the write data specified by the write command is to be written to be associated with LBA which indicates the original write destination (write access range) of the write data specified by the write command.

Then, MPU 20 executes data write for sequentially writing the specified write data to the nonvolatile cache area 110 in units of sectors starting from a sector located after the end of the last write data stored in the nonvolatile cache area 110 (block 1202). In the data write, as is the case with the second embodiment, the write count (INDI [N]) with an incremented value is embedded in each of the sector data corresponding to the write data.

Before the data written to the nonvolatile cache area 110 is written to the original write access range on the disk 11, read of the data may be specified by a read command from the host 100. Whether or not the data specified by the host 100 is present in the nonvolatile cache area 110 can be determined by referencing the management bale. If the data specified by the host 100 is present in the nonvolatile cache area 110, a data read process for reading the data from the nonvolatile cache area 110 is executed.

Figure 13:
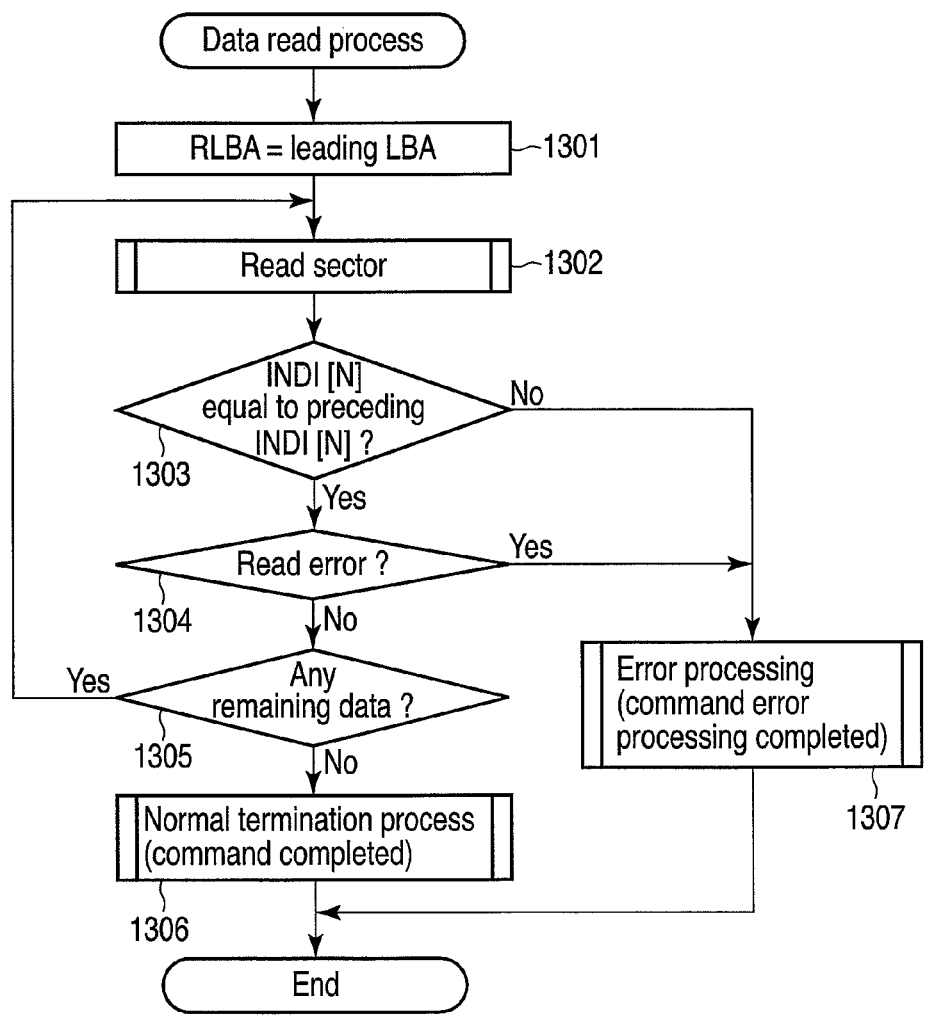
FIG. 13 is a flowchart showing an exemplary procedure of a process of reading data from the nonvolatile cache area which process is applied in the third embodiment.

The procedure of a data read process for reading data from the nonvolatile cache area 110 which process is applied in the third embodiment will be described with reference to the flowchart in FIG. 13. First, MPU 20 sets a read logical block address RLBA specifying a read target sector to be the leading LBA of a read access range (block 1301). Then, MPU 20 executes sector read for reading sector data from a sector in the nonvolatile cache area 110 corresponding to the current read logical block address RLBA (block 1302). Here, the sector in the nonvolatile cache area 110 corresponding to RLBA can be identified by referencing the management table.

An ECC module 17 detects and corrects a possible error in the user data included in the sector data read by the sector read, based on ECC included in the sector data. By detecting and correcting a possible error in the user data, the ECC module 17 thus determines whether or not a read error has occurred. The result of the determination made by the ECC module 17 is communicated to MPU 20.

MPU 20 determines whether or not INDI [N] (write count) included in the sector data read from the sector corresponding to RLBA is equal to INDI [N] included in the preceding sector (block 1303). If INDI [N] included in the read sector data is equal to INDI [N] included in the preceding sector (Yes in block 1303), MPU 20 determines whether or not a read error has been detected, based on the result of the determination made by the ECC module 17 (block 1304).

If no read error has been detected (No in block 1304), that is, if INDI [N] included in the read sector data is equal to INDI [N] included in the preceding sector and no read error has been detected, MPU 20, for example, increments RLBA by one and proceeds to block 1305. In block 1305, MPU 20 determines whether or not there remains any data to be read. If there remains any data to be read (Yes in block 1305), MPU 20 returns to block 1302 to execute the sector read again. In contrast, if there remains no data to be read (No in block 1305), MPU 20 executes a normal termination process (block 1306). If MPU 20 executes block 1304 next to block 1302 to detect no read error (No in block 1304), MPU 20 may execute block 1303.

If INDI [N] included in the read sector data is not equal to INDI [N] included in the preceding sector (No in block 1303), MPU 20 determines the current read target sector to be the one where the process has been suspended as a result of power shutdown during the write of the write data to the nonvolatile cache area 110. Thus, MPU 20 executes error processing (block 1307). In the error processing, MPU 20 can return, to the host 100, a portion of the data within the read access range specified by the read command from the host 100 which is included in the sectors from the leading sector, from which data has already been read normally, through the sector preceding the current read target sector. Furthermore, even when INDI [N] included in the read sector data is equal to INDI [N] included in the preceding sector (Yes in block 1303), if a read error is detected (Yes in block 1304), MPU 20 executes error processing (block 1307).

As described above, in the third embodiment, even in the write data (data block) specified by the host 100 and temporarily stored in the nonvolatile cache area 110 (temporary storage area) on the disk 11, the indicator INDI is embedded in each of the sector data. Furthermore, the attribute value indicative of the attribute of rewrite, such as the write count (INDI [N]), is included in the indicator INDI in each sector data. Thus, if power shutdown occurs during the write of write data to the nonvolatile cache area 110, the sector where the process has been suspended as a result of the power shutdown can be easily identified. Hence, even though HDD 10 uses the nonvolatile cache area 110, the integrity of the data stored up to the sector preceding the one where the process has been suspended can be ensured, as is the case with the current HDD, which does not use the nonvolatile cache area 110.

[Modification]

Figure 14:
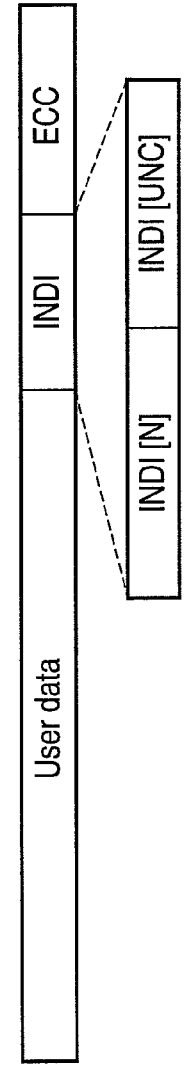
FIG. 14 is a diagram showing a modification of a sector data format.

In the second and third embodiments, in addition to the write count (INDI[N]), the INDI (UNC) bit applied in the first embodiment may be included in the indicator INDI, as shown in FIG. 14.

According to the embodiments and modification, in an HDD configured to controllably rewrite a data block with a certain length and typified by an HDD to which shingled write is applied, the indicator indicative of the attribute relating to the rewrite of each sector data is embedded in the sector data written to the disk. Thus, the attribute relating to the rewrite of each sector data can be detected in the indicator without the use of any management table. The attribute relating to the rewrite enables detection of a sector in which an error has occurred, for example, a sector determined to contain invalid data as a result of a read error during the rewrite of a data block on the disk or a sector where the process has been suspended as a result of shutdown of power to HDD during the rewrite of the data block.

Here, the rewrite of a data block is not necessarily limited to the update of the date block. For example, the data block rewrite includes write of a data block read from a first area on the disk to the first area or to a second area on the disk which is different from the first area. Such rewrite of a data block is executed in order to refresh the data block.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
a disk comprising a plurality of data sectors which comprise indicator areas;
a controller configured to perform a data rewrite, the data rewrite comprising reading a first data block stored in the disk in units of data sectors and writing a second data block used as a rewrite data corresponding to the read first data block to a write destination on the disk when rewriting the first data block is requested; and
an indicator module configured to set an indicator indicative of an attribute associated with data rewrite in the indicator area of each sector data in the second data block when the sector data is written to the write destination,
wherein:
the indicator module is further configured to set a first indicator in the indicator area of a second sector data in the second data block if a read error has occurred during read of a first sector data in the first data block, wherein the second sector data corresponds to the first sector data, and wherein the first indicator comprises a read uncorrectable bit indicative of a read error; and
the controller is further configured to cause the indicator module to set a second indicator in the indicator area of a fourth sector data in the second data block, the fourth sector data corresponding to a third sector data in the first data block, wherein the second indicator is configured to inherit the read uncorrectable bit of the first indicator if the third sector data is read and the first indicator is set in the indicator area of the read third sector data.

2. The magnetic disk drive of claim 1, wherein the indicator module is further configured to report a read error to the controller if the first indicator is set in the indicator area of the read third sector data.

3. The magnetic disk drive of claim 1, wherein the controller is configured to execute the data rewrite by shingled write.

4. A magnetic disk drive comprising:
   a disk comprising a plurality of data sectors which comprise indicator areas;
   a controller configured to perform a data rewrite, the data rewrite comprising reading a first data block stored in the disk in units of data sectors and writing a second data block used as a rewrite data corresponding to the read first data block to a write destination on the disk when rewriting the first data block is requested; and
   an indicator module configured to set an indicator indicative of an attribute associated with data rewrite in the indicator area of each sector data in the second data block when the sector data is written to the write destination,
   wherein:
      a third data block is stored in the write destination;
      an indicator comprising a first attribute value is set in the indicator area of sector data in the third data block; and
      the indicator module is configured to set, based on the indicator comprising the first attribute value, an indicator comprising a second attribute value different from the first attribute value, in the indicator area of the each sector data in the second data block.

5. The magnetic disk drive of claim 4, wherein the controller is configured to detect that power to the magnetic disk drive has been shut down during writing to the write destination for the second data block based on detecting that an attribute value set in the indicator area of a leading data sector at the write destination differs from an attribute value set in the indicator area of a final sector data at the write destination after the writing the second data block was suspended.

6. The magnetic disk drive of claim 4, wherein the controller is configured to detect a data sector at the write destination, in which the attribute value in the indicator set in the indicator area of the data sector has changed because the writing to the write destination was suspended based on the power shutdown of the magnetic disk drive.

7. The magnetic disk drive of claim 6, wherein:
   the disk comprises a temporary storage area wherein write data specified by a host is temporarily stored;
   the controller is further configured to control writing of the write data to the temporary storage area;
   an indicator comprising a third attribute value is set in the indicator area of sector data at a write destination in the temporary storage area to which the write data is to be written; and
   the indicator module is further configured to set an indicator comprising a fourth attribute value different from the third attribute value in the indicator area of each sector data corresponding to the write data based on the indicator comprising the third attribute value.

8. The magnetic disk drive of claim 4, wherein:
   the first attribute value is a first write count; and
   the second attribute value is a second write count equal to the first write count plus one.

9. A method for rewriting a data block in a magnetic disk drive, the disk drive comprising a disk, the disk comprising a plurality of data sectors which comprise indicator areas, wherein the method comprises:
   reading a first data block stored in the disk in units of data sectors when rewriting the first data block is requested;
   writing a second data block used as a rewrite data corresponding to the read first data block to a write destination on the disk; and
   setting an indicator indicative of an attribute associated with data rewrite in the indicator area of each sector data in the second data block when sector data is written to the write destination,
   wherein:
      a third data block is stored in the write destination;
      an indicator comprising a first attribute value is set in the indicator area of sector data in the third data block; and
      the method further comprising setting, based on the indicator comprising the first attribute value, an indicator comprising a second attribute value different from the first attribute value, in the indicator area of the each sector data in the second data block.

* * * * *